United States Patent [19]

Verdina et al.

[11] 4,005,509
[45] Feb. 1, 1977

[54] JIFFY WASH LINE ADJUSTER

[76] Inventors: Salvatore Verdina, c/o George Spector, 3615 Woolworth Bldg., 233 Broadway; George Spector, 3615 Woolworth Bldg., 233 Broadway, both of New York, N.Y. 10007

[22] Filed: Apr. 14, 1975

[21] Appl. No.: 567,492

[52] U.S. Cl. .............. 24/133; 24/134 KC; 24/68 R

[51] Int. Cl.² ............................. F16G 11/10

[58] Field of Search ........ 24/133, 134 KC, 134 KB, 24/68 A, 68 CD, 68 R, 132; 254/73, 68, 79

[56] References Cited

UNITED STATES PATENTS

| 94,914 | 9/1869 | Robbins | 24/133 |
|---|---|---|---|
| 554,002 | 2/1896 | Rohne | 24/133 |
| 813,457 | 2/1906 | Seebach | 24/133 |
| 881,041 | 3/1908 | Almstead | 24/134 KC |
| 1,074,736 | 10/1913 | Noll | 24/133 |
| 1,533,504 | 4/1925 | Kunz | 24/133 |
| 1,686,581 | 10/1928 | Stewart | 24/133 |
| 1,969,026 | 8/1934 | Morris | 24/133 |
| 2,188,134 | 1/1940 | Hough | 24/134 KC |

*Primary Examiner*—Bernard A. Gelak

[57] ABSTRACT

An item of hardware for installation along a clothes line for taking up line slack, the device comprising a clamp that is made of two crossing levers pivotally connected together at their center and having jaws at one end between which the clothes line is held, and the opposite handle ends of the levers each having an opening, one of the openings having an end of the clothes line tied thereto, while the line free end, after being passed between pulleys, slidably passed through the other lever opening and then between the jaws, and the terminal end of the line is left dangling freely therefrom.

1 Claim, 5 Drawing Figures

U.S. Patent  Feb. 1, 1977  4,005,509
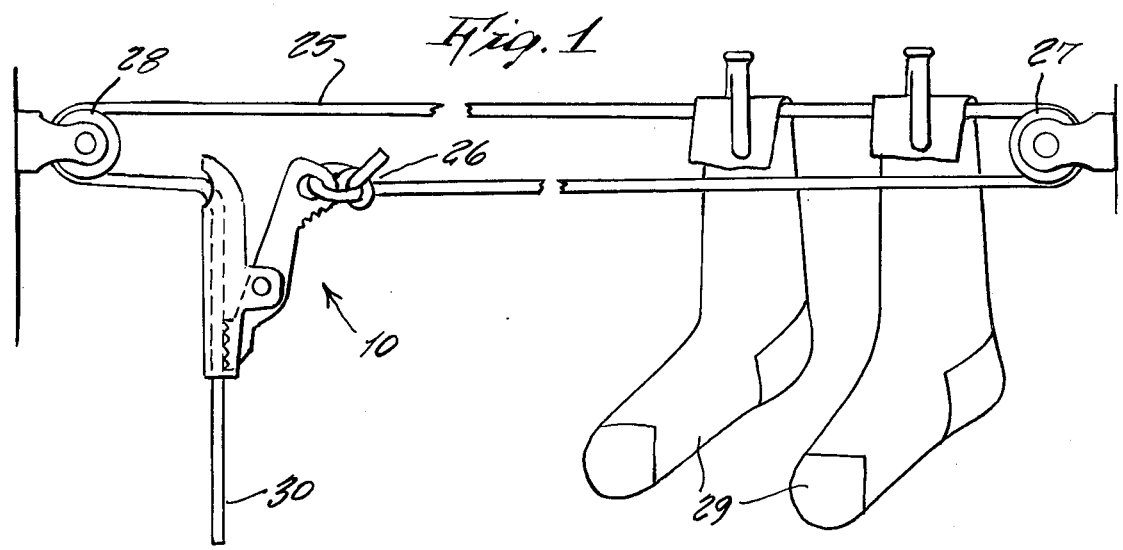
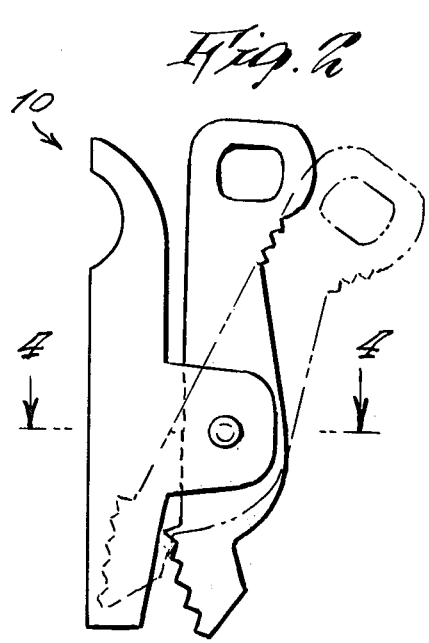
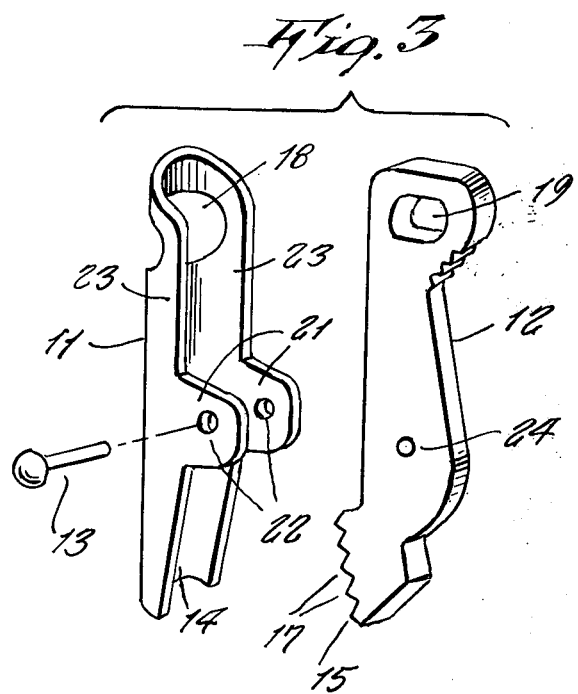
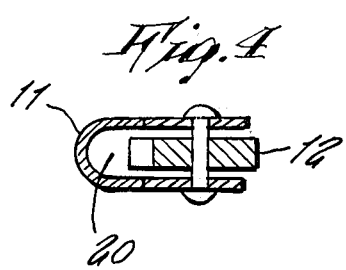
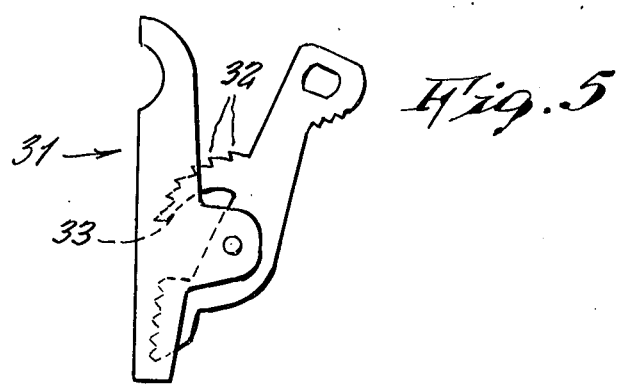

JIFFY WASH LINE ADJUSTER

This invention relates generally to rope take up clamps.

A principal object of the present invention is to provide a clamp designed particularly for use on a clothes line, and which permits quick adjustment of tension on the clothes line.

Another object is to provide a jiffy wash line adjuster which permits the line to be quickly set up or taken down without the necessity of making any securing knots when setting up and which would require untying when taking down the line.

Yet another object is to provide a jiffy wash line adjuster which is slip proof.

Other objects are to provide a jiffy wash line adjuster which is simple in design, inexpensive to manufacture, rugged in construction, easy to use and efficient in operation.

These and other objects will be readily evident upon a study of the following specification and the accompanying drawing wherein:

FIG. 1 is a side view of the invention shown installed along a clothes line.

FIG. 2 is an enlarged side view of the invention, shown per se.

FIG. 3 is a perspective view of the components of the device shown disassembled.

FIG. 4 is a cross sectional view taken on line 4—4 of FIG. 2.

FIG. 5 is a side view of a modified design of the invention which includes an automatic tension take up.

Referring now to the drawing in detail, and more particularly to FIGS. 1 through 4 at this time, the reference numeral 10 represents a jiffy wash line adjuster according to the present invention wherein the same consists of a pair of crossing levers 11 and 12 pivotally attached together at their centers by a rivet 13. clamping jaws 14 and 15 are formed at their respective one ends, the jaw 15 comprising a row of teeth 17. The opposite ends of the levers are each provided with an opening 18 and 19 respectively therethrough.

As best shown in FIGS. 3 and 4, it is to be noted that the lever 11 is of channel shape having a central longitudinal slot 20 into which the other lever fits. Accordingly, the lever 11 includes spaced apart side tabs 21 having aligned openings 22 for receiving the rivet 13, and the opening 18 is along an axis that is parallel the flat plane of tabs and the two sides 23 of the channel.

The lever 12, on the other hand comprises simply of a flat, thick member having opening 24 for alignment between openings 22. The opening 19 is on an axis that is transverse to a flat plane of the lever 12.

The tool is preferably made of a hard steel.

In use, one end of a clothes line 25 is inserted into openings 19 and secured thereto by a knot 26. The line is then passed around spaced apart pulleys 27 and 28 so to permit wash 29 to be hung therefrom. The free end of the line is then passed through the opening 8 and down the channel slot 20 so to pass between jaws 14 and 15. The remaining end 30 of the line is then free to dangle loosely. The tension of the line cause the ends of the levers having openings 18 and 19 to spread apart so that the jaws 14 and 15 thus firmly grips the line therebetween. To take up the line additionally, the end 30 is simply pulled. To loosen the line, the jaws are forced to spread apart so the end 30 can pass upward therebetween.

In FIG. 5, a modified design of jiffy wash line adjuster 31 includes all of the above described construction, and additionally includes the lever 12 being integrally formed with an elliptical row of ratchet teeth 32 that bear against the line, when the line is already taut and is intended to be additionally taken up more taut. By pivoting the jaws apart, the rotation causes the ratchet teeth to feed the line downward toward the jaws, thus taking up line tension. The ratchet teeth are along a tapering, arcuate projection 33 that flexes increasely toward its narrowing terminal end, and is decreasingly non-flexing toward its base end, so that the teeth grasp of the line is correspondingly more firm as the jaws are maximum spread apart.

Thus a modified design of the invention is provided.

While various changes may be made in the detail construction, it is understood that such changes will be within the spirit and scope of the present invention as is defined by the appended claims.

What is claimed is:

1. In a jiffy wash line adjuster, the combination of a pair of levers having means for pivotally attaching them together at their centers, a pair of corresponding jaws formed at one end of said levers for grasping a clothes line therebetween, and an opposite end of said levers forming handle ends each of which has an opening therethrough, said openings being axially disaligned with each other, one of said levers being of channel construction having a longitudinal central line receiving slot and the other said lever being flat and received within said slot of the other said lever wherein said means comprising a pair of ears extending from the lever of channel construction to receive the other lever including a pivot pin extending through aligned holes in said ears and flat lever spaced from said line receiving slot, wherein the jaw on the flat lever is ratcheted and received fully within the slot of the opposing jaw, said flat lever handle end having a transverse opening for tieing one end of said line, said handle end of the channel lever including an opening to receive the adjustable end of said line, including further means on said flat lever for engaging and forcing the adjustable line in said slot towards and through the jaws responsive to movement of the handles toward each other, said further means gripping said line against the channelled lever, wherein said further means comprises an arcuate projection extending from the flat lever towards the other said lever, wherein said projection curves convexly towards said slot and terminates in substantial axial alignment within the slot, including teeth on the outer periphery of the projection including portions within the slot and portions external to the slot.

* * * * *